United States Patent [19]
Boy et al.

[11] Patent Number: 4,583,147
[45] Date of Patent: Apr. 15, 1986

[54] GAS DISCHARGE OVERVOLTAGE ARRESTER WITH CONCENTRICALLY SURROUNDED SOCKET

[75] Inventors: Jürgen Boy; Gerhard Lange, both of Berlin, Fed. Rep. of Germany

[73] Assignee: Siemens Aktiengesellschaft, Berlin and Munich, Fed. Rep. of Germany

[21] Appl. No.: 726,187

[22] Filed: Apr. 23, 1985

Related U.S. Application Data

[63] Continuation of Ser. No. 551,496, Nov. 14, 1983, abandoned, which is a continuation of Ser. No. 311,927, Oct. 16, 1981, abandoned.

[30] Foreign Application Priority Data

Nov. 13, 1980 [DE] Fed. Rep. of Germany ....... 3042847

[51] Int. Cl.[4] .............................................. H02H 9/06
[52] U.S. Cl. .................................... 361/120; 361/119; 361/124
[58] Field of Search ............... 361/120, 119, 124, 129, 361/117; 313/325, 231.1

[56] References Cited

U.S. PATENT DOCUMENTS

| | | | |
|---|---|---|---|
| 3,886,411 | 5/1975 | Klayum | 361/120 X |
| 3,959,696 | 5/1976 | Lange et al. | 361/120 |
| 4,132,915 | 1/1979 | Wilms | 361/124 X |
| 4,241,374 | 12/1980 | Gilberts | 361/124 |
| 4,266,260 | 5/1981 | Lange et al. | 361/120 |
| 4,287,548 | 9/1981 | Hahndorff | 361/120 |

FOREIGN PATENT DOCUMENTS 2828650 1/1980 Fed. Rep. of Germany .

*Primary Examiner*—Harry E. Moose, Jr.
*Attorney, Agent, or Firm*—Herbert L. Lerner; Laurence A. Greenberg

[57] ABSTRACT

Overvoltage arrester having a gas-filled housing wherein, spaced from one another by a tubular insulator, cylindrical electrodes ending frustoconically are disposed opposite one another and are formed, in a region of active surfaces thereof, with walls that are thicker than conical side walls thereof located in a region of transition to the insulator, at least one line of electrically conductive material being disposed at the inner surface of the tubular insulator and extending as an ignition line in direction from the one cylindrical electrode to the other, the electrodes and the insulator being receivable in a metallic sleeve acting as a socket at ground potential and having a movable surrounding cage, including a metallic sleeve for receiving the electrodes and the insulator, the sleeve serving as a socket and having a movable cage substantially concentrically and closely surrounding the electrodes and the insulator, one of the electrodes being a wire or pin electrode and the other electrode being a hollow electrode and having a rear space wherein low vapor deposition occurs, the ignition line being electrically conductively connected to the one electrode and terminating in the rear space of the other electrode, the electrodes being disposed relative to one another so that an approximately equal spacing is provided between the electrodes and between the other electrode and the ignition line.

5 Claims, 1 Drawing Figure

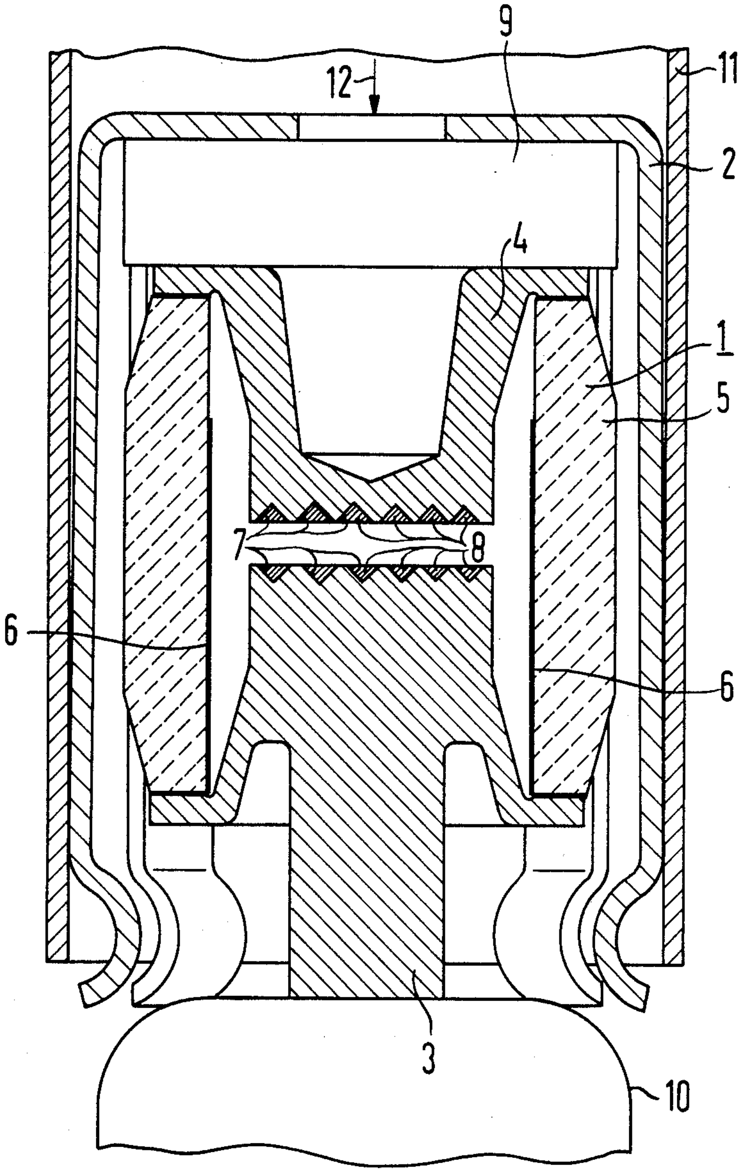
9
12
11
2
4
1
5
7
8
6
6
3
10

GAS DISCHARGE OVERVOLTAGE ARRESTER WITH CONCENTRICALLY SURROUNDED SOCKET

This application is a continuation of application Ser. No. 551,496, filed Nov. 14, 1983, now abandoned, which is a continuation of application Ser. No. 311,927, filed Oct. 16, 1981, now abandoned.

The invention relates to an overvoltage arrester with a gas-filled housing wherein, spaced from one another by a tubular insulator, cylindrical electrodes ending frustoconically are disposed opposite one another and are formed, in a region of active surfaces thereof, with thicker walls than the conical side walls thereof located in a region of transition to the insulator, at least one line of electrically conductive material being disposed at the inner surface of the tubular insulator and extending as an ignition line in direction from the one electrode to the other electrode, the overvoltage arrester being installable in a metallic sleeve serving as a socket with a movable cage enclosing the arrester.

Such an overvoltage arrester has become known heretofore from German Published Non-Prosecuted Application (DE-OS) No. 28 28 650. The arrester has copper electrodes with a strongly pronounced honeycomb or waffle-like pattern which contains electrode activation substance. The ceramic insulator surrounds the electrodes which are spaced a slight distance from one another. Several graphite ignition lines are applied to the ceramic insulator body in order to reduce the surge response voltage of the arrester. The graphite ignition lines have no contact with the electrodes at both ends and are therefore called center ignition lines. In this manner, insulation sections are formed in a shaded-off rear space, which are not vapor-deposited by cathode sputtering even if stressed during the entire service life with 500-Å waves 10,1000 μs. The effect of center ignition lines on the surge response voltage is less, however, than that of ignition lines which are connected to an electrode, so that for life operation with center ignition lines, the permissible response limit is exceeded sooner.

In the U.S.A., gas-filled overvoltage arresters are used increasingly for the protection of telephone installations against overvoltages. For station protection and central-building protection, sockets with a short-circuiting mechanism are in use. A sleeve with movable cage encloses the overvoltage arrester closely. Gas-filled overvoltage arresters with good electrical properties have become known heretofore from the aforementioned German Published Application.

It is accordingly an object of the invention to utilize the electrical influence of the concentrically surrounding socket to provide gas-filled overvoltage arresters with further improved life span or durability characteristic.

With the foregoing and other objects in view, there is provided, in accordance with the invention, overvoltage arrester having a gas-filled housing wherein, spaced from one another by a tubular insulator, cylindrical electrodes ending frustoconically are disposed opposite one another and are formed, in a region of active surfaces thereof, with walls that are thicker than conical side walls thereof located in a region of transition to the insulator at least one line of electrically conductive material being disposed at the inner surface of the tubular insulator and extending as an ignition line in direction from the one cylindrical elelctrode to the other, the electrodes and the insulator being receivable in a metallic sleeve acting as a socket at ground potential and having a movable surrounding cage, comprising a metallic sleeve for receiving the electrodes and the insulator serving as a socket and having a movable cage substantially concentrically closely surrounding the electrodes and the insulator, one of the electrodes being a wire or pin electrode and the other electrode being a hollow electrode and having a rear space wherein low vapor deposition occurs, the ignition lines being electrically conductively connected to the one electrode and terminating in the rear space of the other electrode, the electrodes being disposed relative to one another so that an approximately equal spacing is provided between the electrodes and between the other electrode and the ignition line.

In accordance with another feature of the invention, the one and the other electrodes are formed of copper.

In accordance with a further feature of the invention, four of the ignition lines are disposed at the inner surface of the tubular insulator and are formed of graphite.

In accordance with an additional feature of the invention, a honeycomb pattern is formed in the active surfaces of the electrodes wherein an electrode activation substance formed of magnesium oxide and nickel powder having a grain size between 1 and 40 μm is anchored.

In accordance with an added feature of the invention, the sleeve socket has a base spaced from the other electrode, and a soft-solder pellet disposed in the space between the socket base and the other electrode.

The last-mentioned feature further increases the operating reliability of the arrester. When the arrester is overloaded, the soft solder pellet melts and the socket is then pressed against the electrode by means of a spring and, thus, a reliable short circuit to the counterelectrode is brought about through the socket. Overvoltage arresters equipped in this manner are also called arresters with fail-safe behavior.

The invention of the instant application has the following advantages. The d-c response voltage (slow voltage rise) is determined by the electrode spacing. The surge response voltage of the arrester outside the socket exhibits a polarity effect. If the ignition line is at ground potential via the electrode, the arrester has lower surge response voltage values than in the reverse direction. Arresters within the socket have lower surge response voltage values in both polarities because the socket acts as an additional ignition aid. The low surge response voltage values remain during the lifespan or durability test. In connection with an electrode activation substance formed of magnesium oxide and Ni-powder with a grain size between 1 and 40 μm, a number of switching cycles of more than 1000 is achieved in the lifespan test with a 500-Å, wave 10/1000 μs > 1000, on the basis of a stable d-c response voltage and good insulation.

Other features which are considered as characteristic for the invention are set forth in the appended claims.

Although the invention is illustrated and described herein as embodied in gas-discharge overvoltage arrester with concentrically surrounding socket, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a sectional view of the overvoltage arrester according to the invention.

Referring now to the drawing, there is shown therein an overvoltage arrester 1 according to the invention, which has a gas-filled housing, preferably with a rare or noble gas. Into the ends of a tubular insulator 5, cylindrical electrodes 3 and 4 are inserted which end frstoconically and are formed with thicker walls in the region of the active surfaces thereof than are the conical side walls in the region of transition to the insulator 5. The overvoltage arrester 1 is inserted into a metallic sleeve, which serves as a socket 2, and is formed of a movable cage surrounding the arrester 1 concentrically; the cage being slotted laterally and having a central opening at the bottom thereof, as viewed in the FIGURE. The socket 2 is guided in a metallic cylinder 11. When the arrester 1 is inserted, this socket 2 is at ground potential. On the inner wall of the insulator 5, preferably four ignition lines 6 formed of graphite are applied. The ignition lines 6 are electrically conductively connected to the electrode 3 which is formed as a wire or pin electrode, and end in a rear space of the other electrode 4 in which low vapor deposition occurs, the electrode being formed as a perforated or hollow electrode. Both electrodes 3 and 4 are constructed so that an approximately equal spacing is provided formed between the electrodes 3 and 4 and between the perforated electrode 4 and the ignition lines 6. In the active surfaces of the electrodes 3 and 4, which are formed preferably of copper, a deep waffle-like or honey-comb pattern 7 is provided, wherein an electrode activation substance 8 is anchored. The electrode activation substance is preferably formed of magnesium oxide and nickel powder having a grain size between 1 and 40 μm. In this embodiment of the invention, a soft solder pellet 9 is provided between the hollow electrode 4 and the base of the socket 2, the pellet 9 melting when the arrester 1 is overloaded. Then, the socket 2 is pressed against the hollow electrode 4 by spring force, the direction of which is indicated by the arrow 12, and a reliable short circuit is brought about with the wire electrode 3 (counterelectrode) and, indeed, through the side wall of the socket 2 which becomes pressed against the wire contact 10.

We claim:

1. Overvoltage arrester assembly with an arrester having a gas-filled housing wherein, spaced from one another by a tubular insulator, a pair of cylindrical electrodes ending frustoconically are disposed opposite one another and are formed, in a region of active surfaces thereof, with walls that are thicker than conical side walls thereof located in a region of transition to ends of the insulator, at least one line of electricity conductive material being disposed at the inner surface of the tubular insulator and extending as an ignition line in a direction from the one cylindrical electrode to the other, the electrodes and the insulator being receivable in a metallic sleeve acting as a socket and comprising a movable cage concentrically and closely surrounding the arrester, said socket being at ground potential, said socket being formed with a short-circuiting mechanism for short-circuiting the electrodes when an overvoltage of given intensity occurs, one of the electrodes being a wire or pin electrode and the other electrode being a hollow electrode and having a rear space wherein low vapor deposition occurs, the ignition line being electrically conductively connected to the one electrode at one end of the tubular insulator and terminating in said rear space of the other electrode at a location spaced from the other end of the tubular insulator, the other end of the tubular insulator and the other electrode being free of any line of electrically conductive material, the electrodes being disposed relative to one another so that an approximately equal spacing is provided between the electrodes and between the other electrode and the ignition line.

2. Overvoltage arrester according to claim 1 wherein the one and the other electrodes are formed of copper.

3. Overvoltage arrester according to claim 1 wherein four of the ignition lines are disposed at the inner surface of the tubular insulator and are formed of graphite.

4. Overvoltage arrester according to claim 1 wherein a honeycomb pattern is formed in the active surfaces of the electrodes wherein an electrode activation substance formed of magnesium oxide and nickel powder having a grain size between 1 and 40 μm is anchored.

5. Overvoltage arrester according to claim 1 wherein the sleeve socket has a base spaced from the other electrode, and a soft-solder pellet disposed in the space between said socket base and the other electrode.

* * * * *